(12) United States Patent
Shen et al.

(10) Patent No.: US 12,062,244 B2
(45) Date of Patent: Aug. 13, 2024

(54) AI MOTORCYCLE

(71) Applicant: POWERSHOW LIMITED, New Taipei (TW)

(72) Inventors: Yu-Chih Shen, New Taipei (TW); Yu Sun, New Taipei (TW); Chiou-Shann Fuh, New Taipei (TW); Wen-Zhen Shiu, New Taipei (TW)

(73) Assignee: POWERSHOW LIMITED, New Taipei (TW)

( * ) Notice: Subject to any disclaimer, the term of this patent is extended or adjusted under 35 U.S.C. 154(b) by 595 days.

(21) Appl. No.: 17/475,394

(22) Filed: Sep. 15, 2021

(65) Prior Publication Data

US 2022/0092327 A1 Mar. 24, 2022

(30) Foreign Application Priority Data

Sep. 18, 2020 (TW) .................................. 109132255
Sep. 6, 2021 (TW) .................................. 110132984

(51) Int. Cl.
*G06V 20/62* (2022.01)
*B60W 40/08* (2012.01)
(Continued)

(52) U.S. Cl.
CPC ............. *G06V 20/62* (2022.01); *B60W 40/08* (2013.01); *B62J 43/30* (2020.02); *B62J 45/20* (2020.02);
(Continued)

(58) Field of Classification Search
CPC ...... G06V 20/62; G06V 20/56; G06V 20/625; B62J 45/20; B62J 45/42; B62J 50/30;
(Continued)

(56) References Cited

U.S. PATENT DOCUMENTS 10,373,226 B1 * 8/2019 Russell ............. G06Q 30/0635
10,643,467 B2 * 5/2020 Alon ...................... G08G 1/054
(Continued)

FOREIGN PATENT DOCUMENTS

JP 04-090100 A 3/1992
JP 3206606 U 9/2016
JP 2019-086885 A 6/2019

OTHER PUBLICATIONS

Decision to Grant a Patent issued in corresponding Japanese Patent Appln. No. 2021-152593 dated Aug. 21, 2023, with English Translation.
(Continued)

*Primary Examiner* — Wesley J Tucker
(74) *Attorney, Agent, or Firm* — BACON & THOMAS, PLLC

(57) ABSTRACT

The present invention is an AI motorcycle comprising a motorcycle, an AI device, a first plate image acquisition device, a second plate image acquisition device, a display device, and an alert device. Thereby, there are a smart movable investigation and crime prevention system, a multi-lane plate number and smart street lamp recognition system, a portable face recognition system, a portable drunk driving detection system, a mobile recognition integrated radar speedometer system, a mobile image recognition integrated RFID receiver, and equipped with multiple application functions, including a 360° panoramic camera for road condition recording and image analysis, a cloud database police network system implementation, a roadside parking billing plate recognition function, and a multi-lane plate number recognition functions are accomplished when riding the motorcycle on patrol.

15 Claims, 7 Drawing Sheets

(51) Int. Cl.
| | |
|---|---|
| *B62J 43/30* | (2020.01) |
| *B62J 45/20* | (2020.01) |
| *B62J 45/42* | (2020.01) |
| *B62J 50/22* | (2020.01) |
| *G05B 13/02* | (2006.01) |
| *G05D 23/19* | (2006.01) |
| *G06F 3/0488* | (2022.01) |
| *G06F 16/58* | (2019.01) |
| *G06V 20/56* | (2022.01) |
| *G06V 40/16* | (2022.01) |
| *G08B 21/18* | (2006.01) |
| *H04L 67/10* | (2022.01) |
| *H04L 67/12* | (2022.01) |
| *H04N 23/56* | (2023.01) |
| *H04N 23/57* | (2023.01) |

(52) U.S. Cl.
CPC ............... *B62J 45/42* (2020.02); *B62J 50/22* (2020.02); *G05B 13/0265* (2013.01); *G06F 16/58* (2019.01); *G06V 20/56* (2022.01); *G08B 21/185* (2013.01); *H04N 23/56* (2023.01); *H04N 23/57* (2023.01); *B60W 2040/0836* (2013.01); *B60W 2300/36* (2013.01); *B60W 2420/403* (2013.01); *B60W 2420/408* (2024.01); *B60W 2540/24* (2013.01); *G05D 23/1917* (2013.01); *G06F 3/0488* (2013.01); *G06V 40/16* (2022.01); *H04L 67/10* (2013.01); *H04L 67/12* (2013.01)

(58) Field of Classification Search
CPC ...... B62J 9/14; H04N 23/56; B60W 2300/36; B60W 2420/403; B62K 2202/00; G06N 20/00; G08G 1/054
See application file for complete search history.

(56) References Cited

U.S. PATENT DOCUMENTS

| | | | | |
|---|---|---|---|---|
| 11,417,098 | B1* | 8/2022 | Campbell | H04N 21/2743 |
| 2009/0146845 | A1* | 6/2009 | Hedley | G07B 15/06 |
| | | | | 340/936 |
| 2019/0378347 | A1* | 12/2019 | Gallaway | G06V 20/62 |
| 2020/0014857 | A1* | 1/2020 | Hei | G06V 10/147 |
| 2021/0001945 | A1* | 1/2021 | Hagimoto | B62J 45/40 |
| 2021/0245656 | A1* | 8/2021 | Weldemariam | G06V 20/56 |
| 2023/0091062 | A1* | 3/2023 | Challa | G06V 20/582 |
| | | | | 382/104 |
| 2023/0098779 | A1* | 3/2023 | Mankowski | B62J 27/00 |
| | | | | 340/425.5 |
| 2023/0343114 | A1* | 10/2023 | Gupta | G06V 20/54 |
| 2024/0071109 | A1* | 2/2024 | Brodsky | G06V 20/582 |
| 2024/0163402 | A1* | 5/2024 | Kario | G06V 10/77 |

OTHER PUBLICATIONS

Japanese Certificate of Patent.

* cited by examiner

AI MOTORCYCLE

BACKGROUND OF THE INVENTION

Field of the Invention

The present invention relates to an AI (artificial intelligence) motorcycle, especially to an AI motorcycle that has an effect of active detection when riding the motorcycle on patrol, such that the effects of better investigation and prevention mobility as well as investigation and crime prevention immediacy are achieved.

Descriptions of the Related Art

When a police officer is on patrol, a motorcycle is ridden alternatively. Once a person who behaves or seems to behave as a violator is found, the person is stopped for interrogation. Such stopping for interrogation is time-consuming, so that the aforementioned shortcoming may be avoided effectively if a way of advanced and technological enforcement is introduced in patrol conducted by the police officer. Moreover, investigation and prevention mobility and investigation and crime prevention immediacy are available in an actual law enforcement.

In the invention, a movable carrying vehicle capable of multi-functional smart investigation and crime prevention is developed for a great number of types of existing police motorcycles. On the movable carrying vehicle, equipments such as AI computer, camera and the like are installed, which, while in patrolling, may conduct plate number recognition in real time for a plate in relative movement or a vehicle in roadside parking with respect to a plate of a stolen vehicle or a vehicle used for criminal. Also, a face recognition system software is installed on the AI computer. A portable, lightweight and wireless camera device is worn by a police officer on duty to conduct a real-time face recognition function by means of transmitting an image to the AI computer for motorcycle within a range capable of receiving a signal in order to apply an active detection and protect the person conducting law enforcement with an immediate recognition and alert for a warrent person or a dangerous person. A portable camera is used to develop an algorithm capable of analyzing image recognition with respect to a physiological change due to drinking for discriminating a subject under alcoholic detection. Moreover, a radar speedometer equipment may be installed on the motorcycle, which, in combination with a plate number recognition function of an on-board AI computer, provides an alert for an overspeed vehicle at a certain spot, as well as in combination with information in a cloud vehicle database, providesing a kind reminder via a real-time SMS (Short Message Service) text on a mobile phone for the person whose vehicle is overspeed in order for reducing as more casualties due to overspeed vehicles as possible to achieve the purpose goal of a friendly city.

SUMMARY OF THE INVENTION

The major objective of the present invention is to avoid the current existence of conventional shortcomings mentioned above, in order to improve the effect of active detection when riding a motorcycle on patrol, and achieve the effects of better investigation and prevention mobility and investigation and crime prevention immediacy.

To achieve the objective mentioned above, the present invention is an AI motorcycle comprising: a motorcycle, an AI device, a first plate image acquisition device, a second plate image acquisition device, a display device, and an alert device. The motorcycle includes a transmission device, a containing device, a power device, an illuminating device as well as a control device, the containing device having a cabin, the power device providing the electric power required by the transmission device and the illuminating device; the AI device being provided in the cabin of the containing device, and the AI device being electrically connected to the power device of the motorcycle; the first plate image acquisition device being provided at a front end of the control device of the motorcycle, the first plate image acquisition device being electrically connected to the AI device; the second plate image acquisition device being provided at the front end of the control device of the motorcycle, the second plate image acquisition device being electrically connected to the AI device; the display device being provided at a rear end of the control device of the motorcycle, the display device being electrically connected to the AI device; the alert device being provided in the motorcycle, the alert device being electrically connected to the AI device.

The present invention further provides an AI motorcycle comprising: a motorcycle, an AI device, a first plate image acquisition device, a second plate image acquisition device, a display device, and a power supply adjustment device. The motorcycle includes a transmission device, a containing device, a power device, an illuminating device and a control device, the containing device having a cabin, the power device providing the electric power required by the transmission device and the illuminating device; the AI device being provided in the cabin of the containing device, and the AI device being electrically connected to the power device of the motorcycle; the first plate image acquisition device being provided at a front end of the control device of the motorcycle, the first plate image acquisition device being electrically connected to the AI device; the second plate image acquisition device being provided at the front end of the control device of the motorcycle, the second plate image acquisition device being electrically connected to the AI device; the display device being provided at a rear end of the control device of the motorcycle, the display device being electrically connected to the AI device; the power supply adjustment device being electrically connected to the AI device, the power supply adjustment device serving as an electric power source and an electric power control when the AI device, the first plate image acquisition device, the second plate image acquisition device, the heat dissipation device and the display device are in operation.

In the AI motorcycle mentioned above, the transmission device comprises at least a switch controller, which is electrically connected to the AI device.

In the AI motorcycle mentioned above, the AI device includes a processing unit, a voltage regulation unit, a first plate number discrimination database, a second plate number discrimination database and a storage unit, the voltage regulation unit, the first plate number discrimination database, the second plate number discrimination database and the storage unit being electrically connected to the processing unit, and the voltage regulation unit being electrically connected to the power device of the motorcycle.

In the AI motorcycle mentioned above, the processing unit is used for control and computation processing of the AI device; the voltage regulation unit can regulate the power device to an appropriate output voltage and is provided with a low-voltage alert unit, the storage unit can at least store data from discrimination conducted from the first plate number discrimination database and the second plate number discrimination database.

In the AI motorcycle mentioned above, the first plate number discrimination database may discriminate a plate number of a vehicle in roadside parking, and a plate image for the vehicle in roadside parking is acquired by the first plate image acquisition device, followed by being discriminated from the first plate number discrimination database.

In the AI motorcycle mentioned above, the second plate number discrimination database may discriminate a plate number of a vehicle moving straight, and a plate image for the vehicle moving straight is acquired by the second plate image acquisition device, followed by being discriminated from the second plate number discrimination database.

In the AI motorcycle mentioned above, the AI device has a housing, which can at least accommodate with the processing unit, the voltage regulation unit, the first plate number discrimination database, the second plate number discrimination database and the storage unit, also the AI device can be provided in the cabin of the containing device by means of the housing.

In the AI motorcycle mentioned above, an outer side of the housing has a radiation heat dissipation cooling coating.

In the AI motorcycle mentioned above, a heat dissipation device is comprised further, which is electrically connected to the AI device, the heat dissipation device being provided in the cabin of the containing device and corresponding to the AI device, the AI device further comprising a temperature control module that can detect a temperature of the cabin or the AI device and is provided with a high temperature alert unit, followed by heat dissipation conducted by the heat dissipation device activated by the AI device.

In the AI motorcycle mentioned above, the heat dissipation device has a gas input unit and a gas output unit, the gas input unit guiding an external air into the AI device, the gas output unit guiding an internal gas out of the cabin.

In the AI motorcycle mentioned above, the first plate image acquisition device has a first camera and a first spotlight, the first camera acquiring a plate image of a vehicle in roadside parking, followed by discrimination conducted by the AI device.

In the AI motorcycle mentioned above, the first camera is a CL-95N-3010M camera, which uses NTSC as a signal format, uses a ⅓" CIS image sensor with 1305(H)X1049(V) of pixels, and has a scanning system of 2:1 Interlace, a built-in synchronization system, a horizontal resolution of 800TVL(CVBS 960H), a S/N ratio above 50 dB, a Burst Level of 0.286 Vp-P, a minimum illuminance of 0.1 Lux, a gamma correction of 0.55 with automatic AGC, an electric shutter of 1/480 second, a video output level of 1.0 Vp-p,75 ohm(CVBS 960H), a lens adopting 3.0 mm~10 mm F 1:1.6, using DC 10V to 15V as a voltage source, a power supply current of Max 80 mA(at DC+12V), a storage temperature/humidity of −20° C.~+65° C./max 90%, and an operating temperature/humidity of −10° C.~+60° C./max 80%.

In the AI motorcycle mentioned above, the first spotlight is an IR-5W infrared spotlight with an IR of 850 nm, 30 Angle, uses a DC 5V to 25V as a voltage source, and has a power supply current of Max 470 mA (at DC+12V).

In the AI motorcycle mentioned above, the second plate image acquisition device has a second camera and a second spotlight, the second camera acquiring a plate image of a vehicle moving straight, followed by discrimination conducted by the AI device.

In the AI motorcycle mentioned above, the second camera is a CL-95N-3010M camera, which uses NTSC as a signal format, uses a 1/2.8" CIS image sensor with 1920(H)X1080(V) of pixels, and has a scanning system of Progressive, a horizontal resolution of 2000TVL(CVBS 960H), a Burst Level of 0.286 Vp-P, a S/N ratio above 50 dB, a minimum illuminance of 0.1 Lux, a gamma correction of 0.55 with automatic AGC, an electric shutter of 1/480 second, a video output level of 1.0 Vp-p,75 ohm(AHD 1080P), a lens adopting 3.0 mm~10 mm F 1:1.6, using DC 10V to 15V as a voltage source, a power supply current of Max 80 mA(at DC+12V), a storage temperature/humidity of −20° C.~+65/max 90%, and an operating temperature/humidity of −10° C.~+60° C./max 80%.

In the AI motorcycle mentioned above, the first spotlight is an IR-5W infrared spotlight with an IR of 850 nm, 30 Angle, uses a DC 5V to 25V as a voltage source, and has a power supply current of Max 470 mA (at DC+12V).

In the AI motorcycle mentioned above, the display device is a display screen or a touch screen.

In the AI motorcycle mentioned above, a face image acquisition device, an alcoholic detection device, a radar speedometer device or an RFID receiver is comprised further, the face image acquisition device, the alcoholic detection device and the radar speedometer device being provided removably in the motorcycle, the face image acquisition device, the alcoholic detection device and the radar speedometer device being electrically connected to the AI device.

In the AI motorcycle mentioned above, the AI device further comprises a face recognition module and a cloud police network database. The face image acquisition device can acquire a face image for the face recognition module to conduct recognition in conjunction with the cloud police network database, and store the recognized data in the storage unit.

In the AI motorcycle mentioned above, the face image acquisition device comprises at least a third camera and a third spotlight for the face recognition module to conduct recognition in conjunction with the cloud police network database after the third camera acquires a face image.

In the AI motorcycle mentioned above, a supplement battery is comprised further, which is electrically connected to the AI device.

In the AI motorcycle mentioned above, the alert device comprises at least a buzzer and a lamp set.

In the AI motorcycle mentioned above, the power supply adjustment device includes a power control module and a rechargeable battery, the rechargeable battery being electrically connected to the power control module, the rechargeable battery serving as an electric power source for the AI device, the first plate image acquisition device, the second plate image acquisition device, the heat dissipation device and the display device in operation, the power control module serving as an electric power controller for the rechargeable battery in supplying power for the AI motorcycle.

Thereby, The AI motorcycle according to the present invention has a smart movable investigation and crime prevention system, a multi-lane and smart street lamp plate recognition system, a portable face recognition system, a portable drunk driving detection system, a mobile recognition integrated radar speedometer system, a mobile image recognition integrated RFID receiver, and is equipped with multiple application functions, including a 360° panoramic camera for road condition recording and image analysis, a cloud database police network system implementation, a roadside parking billing plate recognition function, and a multi-lane plate number recognition. Moreover, by using the AI motorcycle according to the present invention as a carrier equipped with a radio frequency identification system (RFID) as a receiver, movable detection and identification may be conducted for a target object, onto which an active/passive RFID TAG is affixed, on a sidewalk along a road, and the data stored in the identified object may be updated, applying to management of roadside tree planting and street lamps. In addition, the use of the AI motorcycle according to the present invention as a carrier, equipped with a 360° panoramic camera for road condition recording and image analysis, may serve for discrimination of automatic driving in traveling on a road in conjunction with a road map database and a current location positioning calibration system.

DETAILED DESCRIPTION OF THE PREFERRED EMBODIMENT

Figure 1:
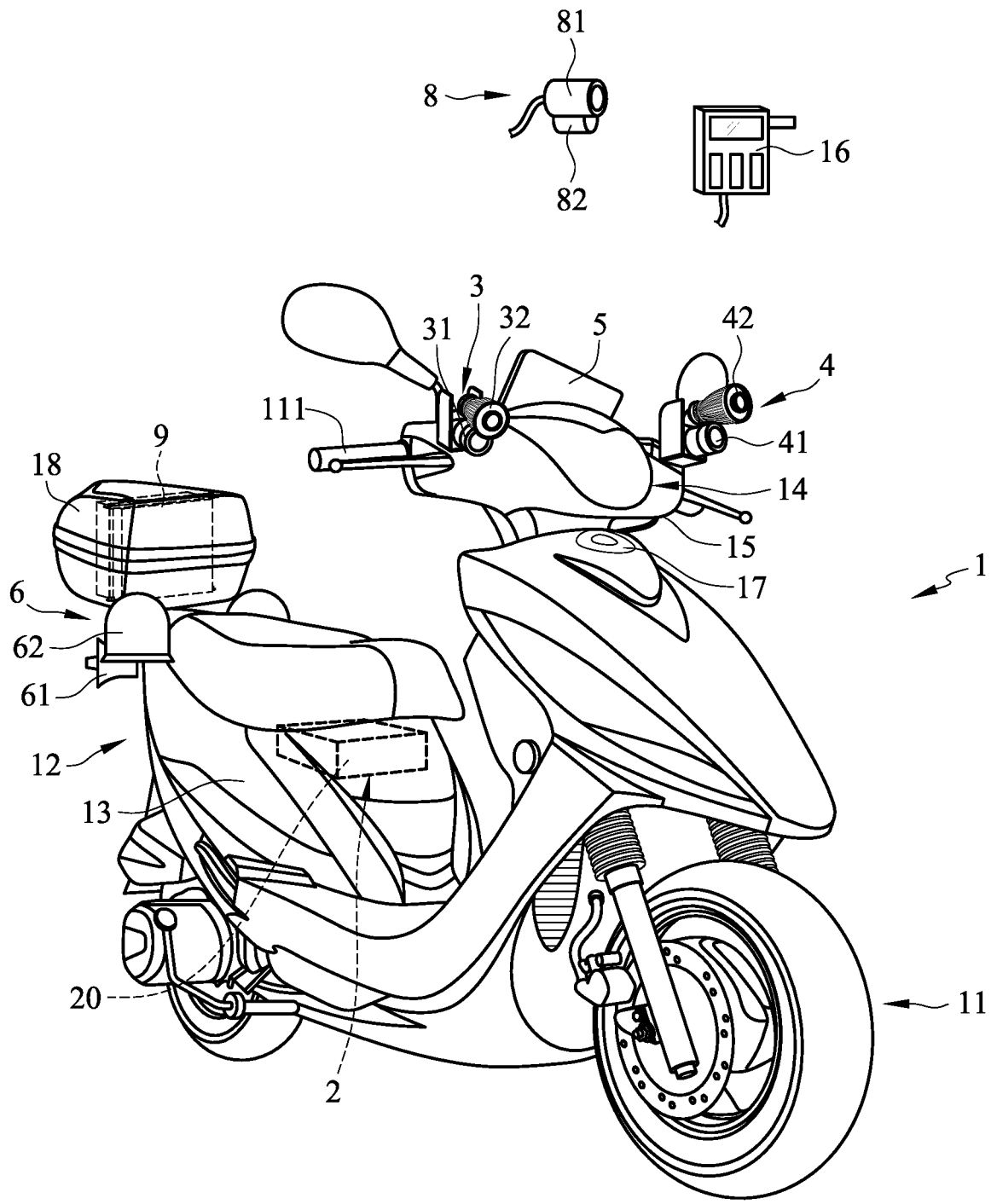
FIG. 1 is a schematic diagram showing a three-dimensional appearance of an AI motorcycle according to the present invention.
Figure 2:
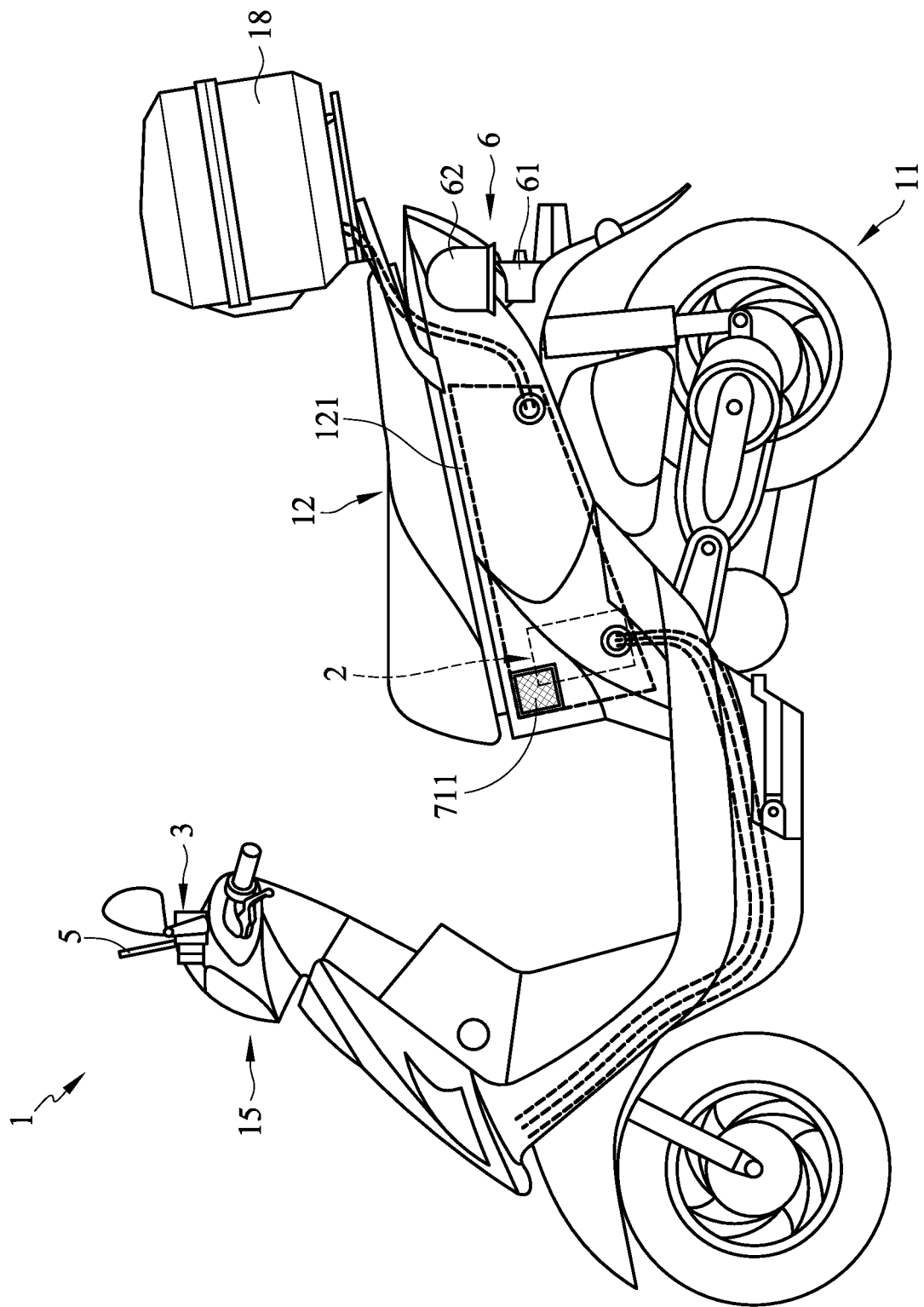
FIG. 2 is a schematic diagram showing a status from a side view according to the present invention.
Figure 3:
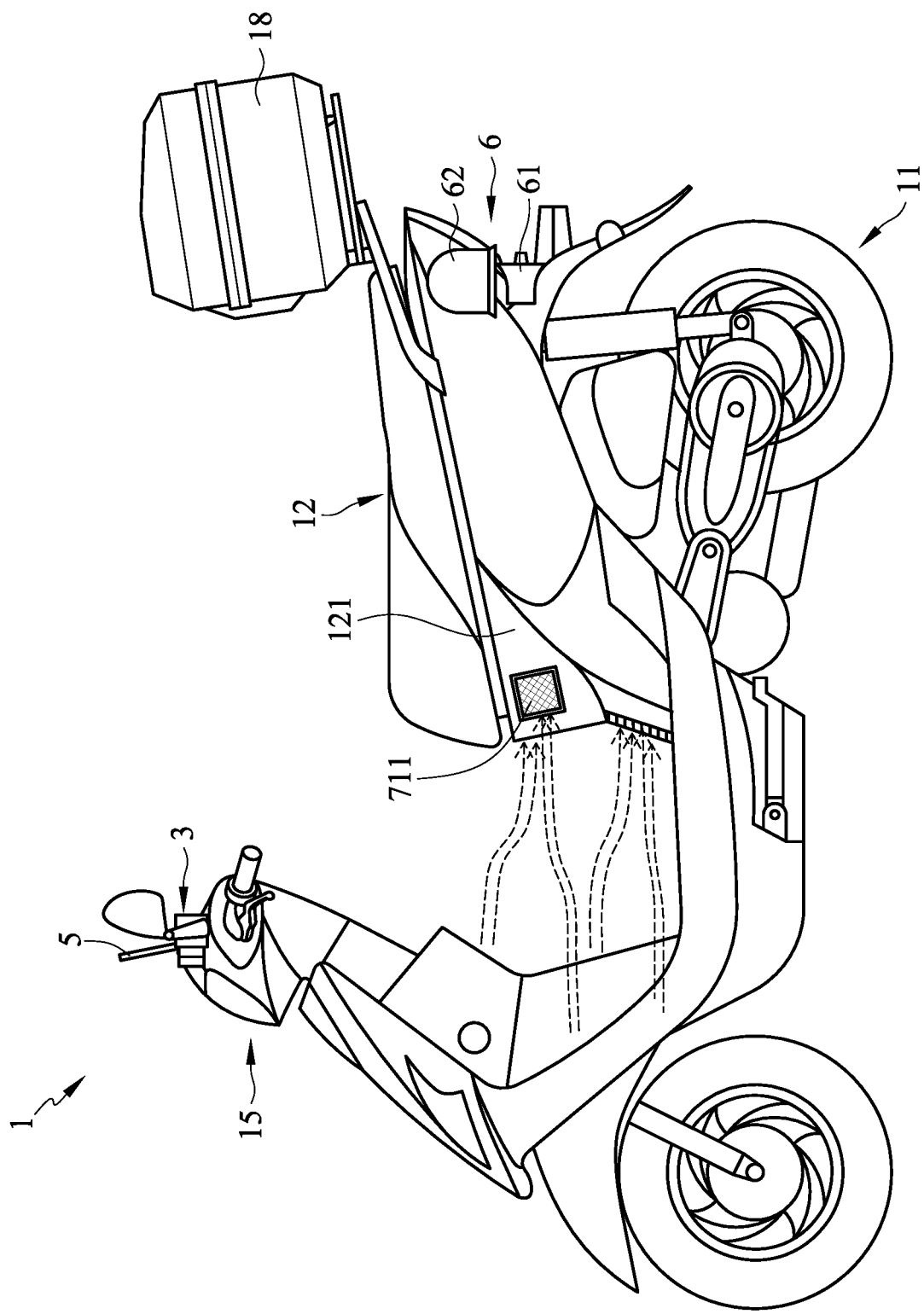
FIG. 3 is a schematic diagram showing another status from the side view according to the present invention.

Refer to FIGS. 1 to 5, which are a schematic diagram showing a three-dimensional appearance of an AI motorcycle according to the present invention, a schematic diagram showing a status from a side view according to the present invention, a schematic diagram showing another status from the side view according to the present invention, a schematic diagram showing gas guiding according to the present invention and a schematic diagram showing operation blocks according to the present invention, respectively. As shown in the figures, the present invention is an AI motorcycle comprising a motorcycle 1, an AI device 2, a first plate image acquisition device 3, a second plate image acquisition device 4, a display device 5, and an alert device 6.

As shown in FIG. 1, the motorcycle 1 includes a transmission device 11, a containing device 12, a power device 13, an illuminating device 14 and a control device 15, the containing device 12 having a cabin 121, the power device 13 providing at least an electric power required by the transmission device 11 and the illuminating device 14; wherein the various devices of the aforementioned motorcycle 1 may be, for example, respective structures described below. The transmission device 11 may be an engine, a power generation system, and a tire; the containing device 12 may be a vehicle body, a vehicle casing and a glove compartment; the power device 13 is a battery system for vehicle; the illuminating device 14 may be a headlight, a rear light and a direction light; the control device 15 is a steering stem.

The AI device 2 is provided in the cabin 121 of the containing device 12, and the AI device 2 is electrically connected to the power device 13 of the motorcycle 1, wherein the AI device 2 may be a stand-alone AI computer, or an AI device implemented remotely by means of a wireless receiver cloud. Since the AI device 2 is provided in the cabin 121 of the containing device 12, the riding state of an occupant may be not influenced while the motorcycle 1 is ridden.

The first plate image acquisition device 3 is provided at a front end of the control device 15 of the motorcycle 1 near the right rear-view mirror, and is electrically connected to the AI device 2. Therein, a first spotlight 32 may be integrated with a first camera 31.

The second plate image acquisition device 4 is provided at the front end of the control device 15 of the motorcycle 1 near the left rear-view mirror, and is electrically connected to the AI device 2. Therein, a second spotlight 42 may be integrated with a second camera 41.

The display device 5 is provided at a rear end of the control device 15 of the motorcycle 1, and is electrically connected to the AI device 2.

The alert device 6 is provided behind or in front of the motorcycle 1, and is electrically connected to the AI device 2.

When a police officer rides a motorcycle on patrol, electric power required by the transmission device 11, the illuminating device 14 and the AI device 2 may be supplied by the power device 13 of the motorcycle 1. Plate images of a vehicle may be acquired in real time with the first plate image acquisition device 3 and the second plate image acquisition device 4. The plate images are discriminated in real time by the AI device 2. The plate images acquired by the first plate image acquisition device 3 and the second plate image acquisition device 4 in riding may be stored. Moreover, in the present invention, the first plate image acquisition device 3 and the second plate image acquisition device 4 may acquire plates of vehicles in roadside parking, or plates of vehicles moving straight (on a multi-lane) for the AI device 2 to conduct discrimination, respectively. Moreover, when the first plate image acquisition device 3 and the second plate image acquisition device 4 acquire plate images of a vehicle in real time, the images may undergo image processing by the AI device 2, followed by being displayed on the display device 5. Also, a result of a discrimination for the plate images may be displayed on the display device 5 after the discrimination is conducted by the AI device 2 for the plate images, such that real-time images are available for a police officer. In addition, when a message about emergency incident is received during riding, the alert device 6 may be activated to give an alert as an avoidance reminder for other vehicles. Thereby, the effect of active detection may be available when riding the motorcycle 1 according to the present invention on patrol to achieve the effects of better investigation and prevention mobility and investigation and crime prevention immediacy.

In a first embodiment of the present invention, the transmission device 11 comprises at least a switch controller 111, which is electrically connected to the AI device 2. As such, when the motorcycle 1 is activated, an electric power from the power device 13 may be obtained at the same time to activate the AI device 2, achieving convenience in use accordingly.

Figure 5:
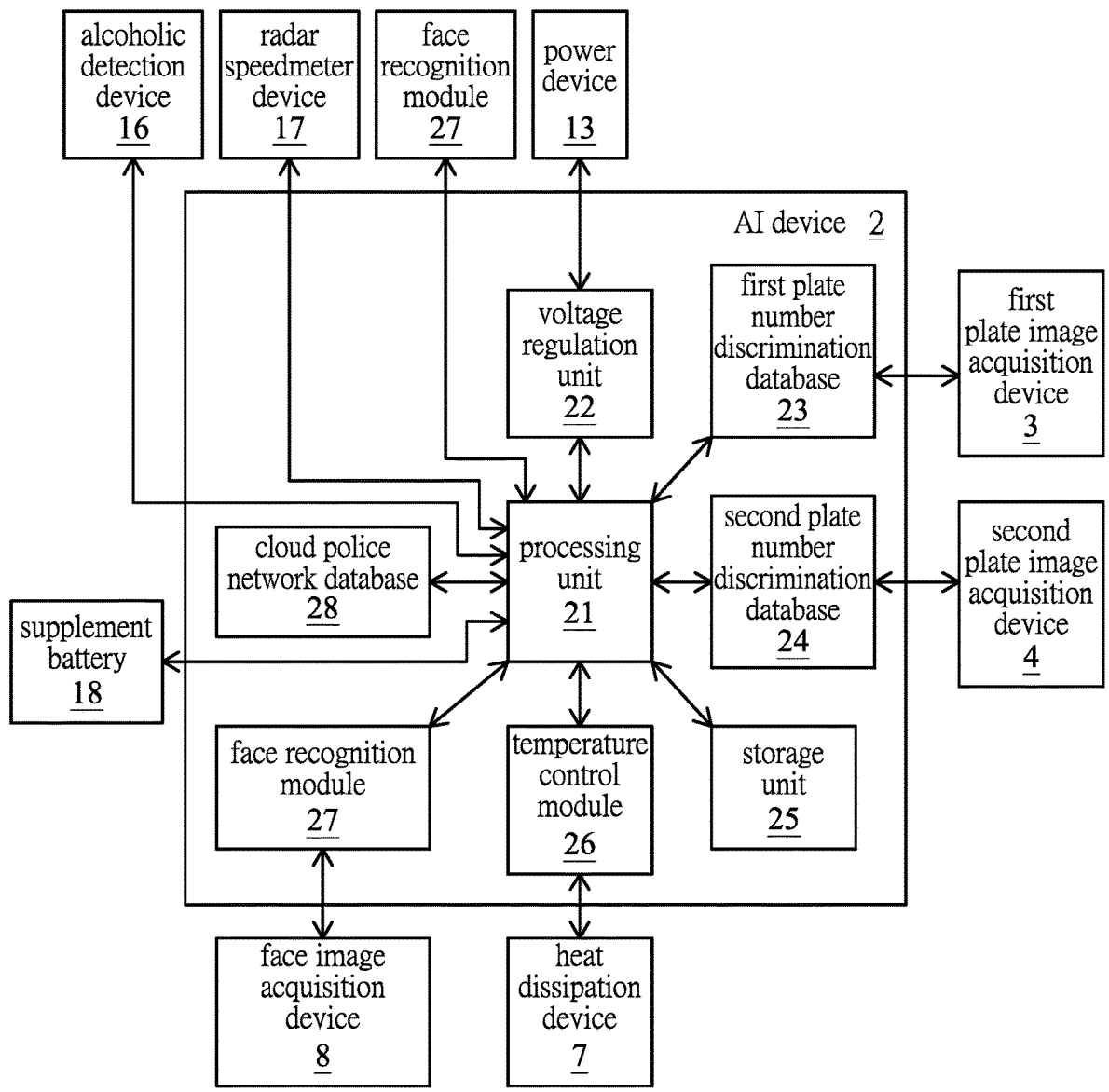
FIG. 5 is a schematic diagram showing operation blocks of an AI motorcycle according to the present invention.

As shown in FIG. 5, in the first embodiment of the present invention, the AI device 2 includes a processing unit 21, a voltage regulation unit 22, a first plate number discrimination database 23, a second plate number discrimination database 24 and a storage unit 25, the voltage regulation unit 22, the first plate number discrimination database 23, the second plate number discrimination database 24 and the storage unit 25 being electrically connected to the processing unit 21.

In the first embodiment of the present invention, the processing unit 21 serves for control and computation processing of the AI device 2, and the processing unit 21 may serve for control and computation processing of the voltage regulation unit 22, the first plate number discrimination database 23, the second plate number discrimination database 24 and the storage unit 25 (as well as control and computation processing of a heat dissipation device 7, a face image acquisition device 8, a radar speedometer device 17, a temperature control module 26, a face recognition module 27, a cloud police network database 28 and a supplement battery 18 described later); wherein the processing unit 21 may be a central processing unit, a single chip, software or a logic circuit. Thereby, a huge amount of data control and computation processing may be performed, achieving stability and accuracy during operation to avoid generation of errors which influence conduction of investigation and prevention tasks.

Figure 6:
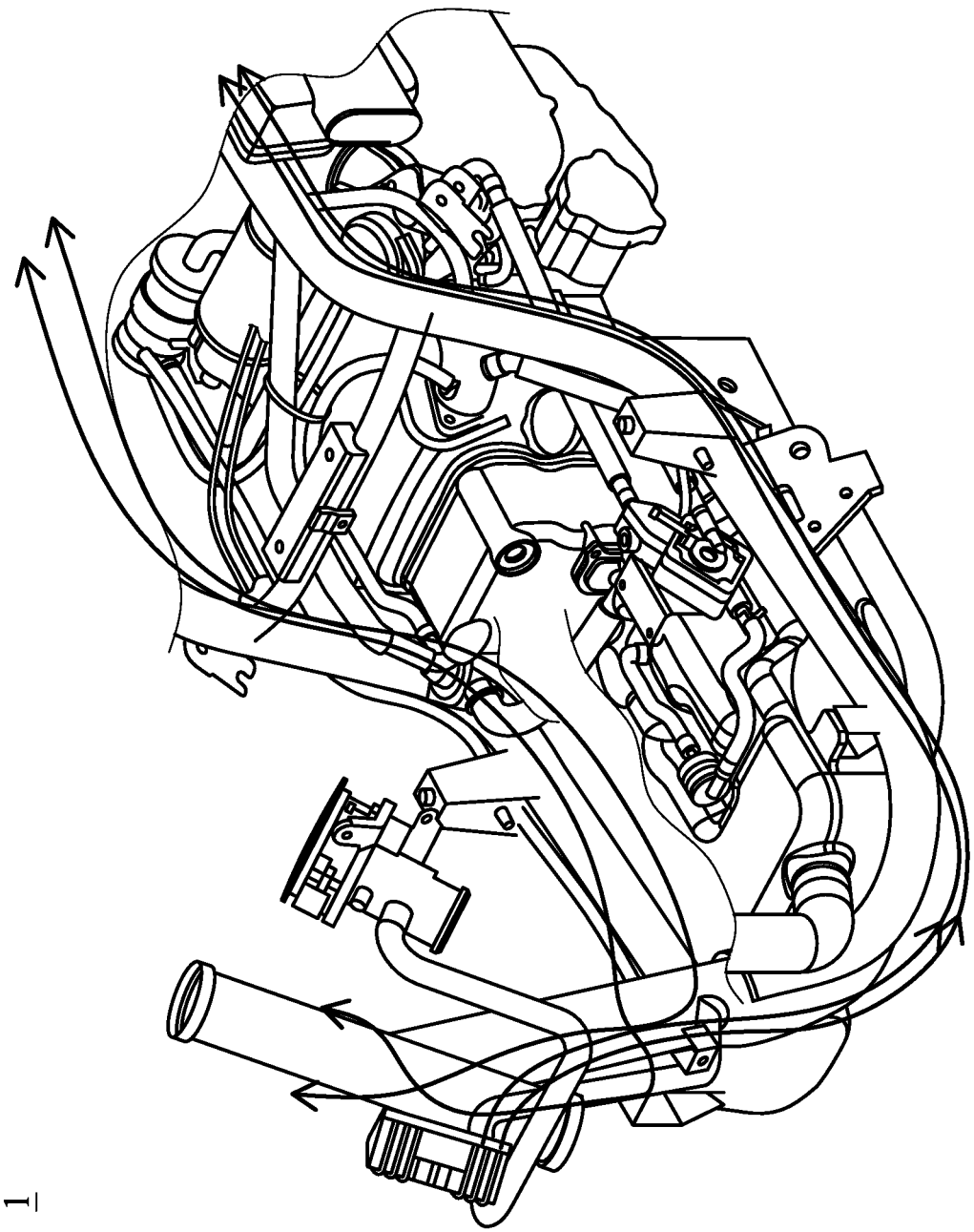
FIG. 6 is a diagram showing an oil gas pipeline system according to the present invention.

In the first embodiment of the present invention, the voltage regulation unit 22 is electrically connected to the power device 13 of the motorcycle 1, and the voltage regulation unit 22 may regulate the power device 13 to an appropriate output voltage. Wherein, the voltage regulation unit 22 may be a transformer or an electronic voltage regulator, which may adjust an output voltage of the power device 13 to at least comply with power requirements of the AI device 2, the first plate image acquisition device 3, the second plate image acquisition device 4, the display device 5 and the alert device 6, in order to avoid overload of electric power which results in damage or loss of electric power for the AI device 2, the first plate image acquisition device 3, the second plate image acquisition device 4, the display device 5 and the alert device 6, such that the effect of stable operation remains. A user may set different detection voltage values for power supply voltages in the AI device 2, and further dispose a low-voltage alert unit in the voltage regulation unit 22, such that an alert signal is issued when a voltage is lower than a set value. FIG. 6 is a diagram showing an oil gas pipeline system of the AI motorcycle 1 according to the present invention, in which arrow indication lines indicate pipelines for oil gas.

In the first embodiment of the present invention, the first plate number discrimination database 23 may discriminate a plate number of a vehicle in roadside parking, and a plate image for the vehicle in roadside parking is acquired by the first plate image acquisition device 3, followed by being discriminated from the first plate number discrimination database 23. The second plate number discrimination database 24 may discriminate a plate number of a vehicle moving straight, and a plate image for the vehicle moving straight is acquired by the second plate image acquisition device 4, followed by being discriminated from the second plate number discrimination database 24. As such, plate images of vehicles in different locations may be acquired with the first plate image acquisition device 3 and the second plate image acquisition device 4, followed by being discriminated with the first plate number discrimination database 23 and the second plate number discrimination database 24 of the AI device 2, respectively. In addition to an effect of better immediate discrimination, an accuracy of discrimination for plate images may be improved further to avoid misjudgment, which influence conduction of investigation and prevention tasks.

In the first embodiment of the present invention, the storage unit 25 may be a hard disk or a cloud drive, and the storage unit 25 may at least store data discriminated from the first plate number discrimination database 23 and the second plate number discrimination database 24. As such, when plate images of a vehicle are acquired by the first plate image acquisition device 3 and the second plate image acquisition device 4, and undergo a real-time discrimination with the first plate number database 23 and the second plate number discriminating database 23 of the AI device 2, the plate images may be stored in the storage unit 25 for evidence preservation and subsequent interpretation processing, such that a better investigation and prevention flexibility is achieved.

In the first embodiment of the present invention, the AI device 2 has a housing 20, which can at least accommodate the processing unit 21, the voltage regulation unit 22, the first plate number discrimination database 23, the second plate number database 24 and the storage unit 25 (and a temperature control module 26, a face recognition module 27 and a cloud police network database 28 described later), the AI device 2 may be provided in the cabin 121 of the containing device 12 in a manner of locking, snapping or other means by the housing 20. In such way, the AI device 2 may accomplish an effect of stable arrangement by the housing 20 to prevent an occupant from causing shift or fall of the AI device 2 during riding of the motorcycle 1.

In the first embodiment of the present invention, an outer side of the housing 20 may have a radiation heat dissipation cooling coating. The radiation cooling coating has a temperature resistance range of −50 to 600° C. The material of the coating is painted/brushed onto a surface of an object to dissipate heat or lower temperature or to accelerate heat conduction. Moreover, the radiation heat dissipation cooling coating may remove heat generated during an operation of the AI device 2 or accelerate heat conduction in the form of infrared rays, and the radiation heat dissipation cooling coating radiates heat into an atmospheric space or an internal space of an object with an emissivity greater than 0.92 E and an infrared wavelength band automatically to accelerate heat exchange, reduce temperatures on a surface and in an interior of the AI device 2, or improve conduction of internal heat to an exterior of the object faster in order for increasing a heat exchange rate.

Figure 4:
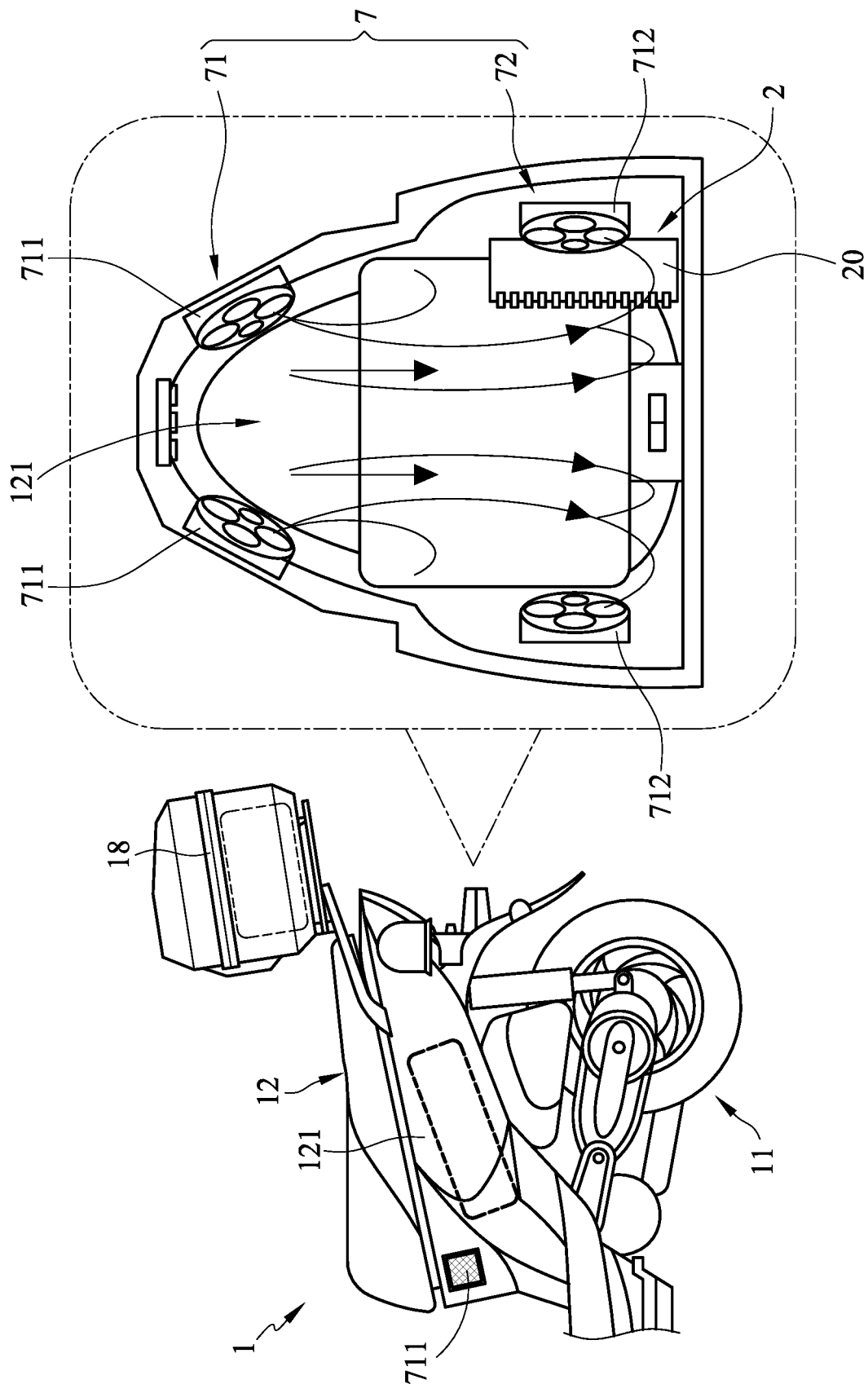
FIG. 4 is a schematic diagram showing gas guiding according to the present invention.

As shown in FIG. 4, in the first embodiment of the present invention, a heat dissipation device 7 is comprised further, which is electrically connected to the AI device 2. The heat dissipation device 7 is provided in the cabin 121 of the containing device 12 and corresponds to the housing 20 of the AI device 2. Moreover, the AI device 2 comprises a temperature control module 26 that is electrically connected to the processing unit 21 and is provided with a high temperature alert unit. The temperature control module 26 may detect a temperature of an environment inside the cabin 121 or an operating temperature of the AI device 2, such that the processing unit 21 of the AI device 2 activates the heat dissipation device 7 to dissipate heat. Thereby, when the AI device 2 is in operation, a temperature of an environment inside the cabin 121 and an operating temperature of the AI device 2 may be detected by the temperature control module 26 in real time. Moreover, when the temperature of the environment inside the cabin 121 subject to a high temperature of an engine or the environment is detected by the temperature control module 26, and the operating temperature of the AI device 2 reaches a set value, the high temperature alert unit will issue an alert signal and notify the processing unit 21, such that the processing unit 21 activates the heat dissipating device 7 to guide gas and serves for heat dissipation in conjunction with the radiation heat dissipation cooling coating of the housing 20, in order to prevent the AI device 2 from damage or affecting a normal discrimination operation due to overheating.

In the first embodiment of the present invention, the heat dissipation device 7 has a gas input unit 71 and a gas output unit 72, the gas input unit 71 guiding an external air into the AI device 2, the gas output unit 72 guiding an internal gas out of the cabin 121. Wherein, the gas input unit 71 and the gas output unit 72 are composed of at least two fans 711 and 712, respectively. Thereby, when the AI device 2 is in operation, the temperature in the environment inside the cabin 121 and the operating temperature of the AI device 2 may be detected by the temperature control module 26 in real time, and when the temperature control module 26 detects that the temperature in the environment inside the cabin 121 and the operating temperature of the AI device 2 reach a set value, a signal is sent to notify the processing unit 21, so that the processing unit 21 activates the heat dissipation device 7, and the fan 711 of the gas input unit 71 is used to guide the external air into the AI device 2, while the gas output unit 72 is followed to guide the internal gas out of the cabin 121 with the fan 712. Thereby, a gas circulation inside the cabin 121 is kept, in conjunction with the use of the radiation heat dissipation cooling coating of the housing 20, the AI device 2 may be prevented from damage due to overheating or affecting the normal discrimination operation.

As shown in FIG. 1, in the first embodiment of the present invention, the first plate image acquisition device 3 has a first camera 31 and a first spotlight 32. A plate image of a vehicle in roadside parking is acquired by the first camera 31, followed by being discriminated from the first plate number discrimination database 23 of the AI device 2. Moreover, when the first camera 31 acquires the plate image of the vehicle in roadside parking, supplementary lighting may be conducted by first spotlight 32 for the acquired plate image of the vehicle in roadside parking to be clearer. Wherein, the first camera 31 and the first spotlight 32 may be in a separate or integral structure design, and the first plate image acquisition device 3 may be provided at the front end of the control device 15 of the motorcycle 1 in a tenon based, clip based or screwing based manner. Accordingly, the present invention may be more in line with actual application requirements.

In the first embodiment of the present invention, the first camera 31 is a CL-95N-3010M camera, which uses NTSC as a signal format, uses a ⅓" CIS image sensor with 1305(H)X1049(V) of pixels, and has a scanning system of 2:1 Interlace, a built-in synchronization system, a horizontal resolution of 800TVL(CVBS 960H), a S/N ratio above 50 dB, a Burst Level of 0.286 Vp-P, a minimum illuminance of 0.1 Lux, a gamma correction of 0.55 with automatic AGC, an electric shutter of 1/480 second, a video output level of 1.0 Vp-p,75 ohm(CVBS 960H), a lens adopting 3.0 mm~10 mm F 1:1.6, using DC 10V to 15V as a voltage source, a power supply current of Max 80 mA(at DC+12V), a storage temperature/humidity of −20° C.~+65° C./max 90%, and an operating temperature/humidity of −10° C.~+60° C./max 80%. Moreover, the first spotlight 32 is an IR-5W infrared spotlight with an IR of 850 nm, 30 Angle, uses a DC 5V to 25V as a voltage source, and has a power supply current of Max 470 mA (at DC+12V). As such, the cooperation of the first camera 31 and the first spotlight 32 may be used to acquire the plate image of the vehicle in roadside parking (the plate of a stationary vehicle) accurately been discriminated via the first plate number discrimination database 23.

In the first embodiment of the present invention, the second plate image acquisition device 4 has a second camera 41 and a second spotlight 42. A plate image of a vehicle moving straight is acquired by the second camera 41, followed by being discriminated from the second plate number discrimination database 24 of the AI device 2. Moreover, when the second camera 41 acquires the plate image of the vehicle moving straight, supplementary lighting may be conducted by second spotlight 42 for the acquired plate image of the vehicle moving straight to be clearer. Wherein, the second camera 41 and the second spotlight 42 may be in a separate or integral structure design, and the second plate image acquisition device 4 may be provided at the front end of the control device 15 of the motorcycle 1 in a tenon based, clip based or screwing based manner. Accordingly, the present invention may be more in line with actual application requirements.

In the first embodiment of the present invention, the second camera 41 is a CL-95N-3010M camera, which uses NTSC as a signal format, uses a 1/2.8" CIS image sensor with 1920(H)X1080(V) of pixels, and has a scanning system of Progressive, a horizontal resolution of 2000TVL(CVBS 960H), a Burst Level of 0.286 Vp-P, a S/N ratio above 50 dB, a minimum illuminance of 0.1 Lux, a gamma correction of 0.55 with automatic AGC, an electric shutter of 1/480 second, a video output level of 1.0 Vp-p,75 ohm(AHD 1080P), a lens adopting 3.0 mm~10 mm F 1:1.6, using DC 10V to 15V as a voltage source, a power supply current of Max 80 mA(at DC+12V), a storage temperature/humidity of −20° C.~+65° C./max 90%, and an operating temperature/humidity of −10° C.~+60° C./max 80%. The first spotlight 42 is an IR-5W infrared spotlight with an IR of 850 nm, 30 Angle, uses a DC 5V to 25V as a voltage source, and has a power supply current of Max 470 mA (at DC+12V). As such, the cooperation of the second camera 41 and the second spotlight 42 may be used to acquire the plate image of the vehicle moving straight (the plate of a moving vehicle) accurately been discriminated via the second plate number discrimination database 24.

In the first embodiment of the present invention, the display device 5 may be a display screen or a touch screen. As such, a result of a discrimination for the plate images may be displayed on the display screen of the display device 5 after the discrimination is conducted by the AI device 2 for the plate images, such that real-time images are available for a police officer. In addition, as the display device 5 is a touch screen, various operations and settings may be conducted by the display device 5 for at least the AI device 2, the first plate image acquisition device 3, the second plate image acquisition device 4 and the alert device 6. Accordingly, the present invention may be more in line with actual application requirements.

In other examples of the present invention, a face image acquisition device 8, an alcoholic detection device 16, a radar speedometer device 17 or an RFID receiver may be comprised further. The face image acquisition device 8, the alcoholic detection device 16, the radar speedometer device 17 and the RFID receiver are provided at appropriate locations on the motorcycle 1 removably by a detachable way. The face image acquisition device 8, the alcoholic detection device 16, the radar speedometer device 17 and the RFID receiver are electrically connected to the processing unit 21 of the AI device 2. As such, a face image of a suspicious person may be acquired by the face image acquisition device 8, and undergoes a relevant recognition by the AI device 2, followed by saving relevant recognition information in the storage unit 25. Moreover, a driver of a vehicle may undergo an alcoholic detection by using the alcoholic detection device 16, which outputs a measurement result to be stored in the storage unit 25. Also, the radar speedometer device 17 may be used to detect whether a vehicle is overspeed, and a relevant computation/recognition is conducted by the AI device 2, followed by storing the detection result in the storage unit 25. Thereby, in addition to be practical with actual application requirements, evidence preservation and subsequent interpretation processing are also available, such that a better investigation and crime prevention flexibility are achieved.

In the embodiment of the present invention mentioned above, the motorcycle 1 may be equipped with a radio frequency identification (RFID) receiver, capable of conducting movable detection and identification for a target object, such as a road tree or a street lamp, onto which an active/passive RFID TAG is affixed, on a sidewalk along a road, and updating memory data of the identified object stored in the storage unit 25, such that application functions, such as management of roadside tree planting and street lamps, are available further.

In the embodiment of the present invention mentioned above, the AI device 2 further comprises a face recognition module 27 and a cloud police network database 28. The face image acquisition device 8 may acquire a face image for the face recognition module 27 to conduct recognition in conjunction with the cloud police network database 28, and store the recognized data in the storage unit 25. As such, when the face image acquisition device 8 acquires a face image of a suspicious person, the face recognition module 27 of the AI device 25 conducts a relevant recognition in conjunction with the cloud police network database 28, followed by storing the relevant recognition result in the storage unit 25. In addition to be practical with actual application requirements, evidence preservation and subsequent interpretation processing are also available, such that a better investigation and crime prevention flexibility are achieved.

In the embodiment of the present invention mentioned above, the face image acquisition device 8 includes at least a third camera 81 and a third spotlight 82 for the face recognition module 27 to conduct recognition in conjunction with the cloud police network database 28 after the third camera 81 acquires a face image. Moreover, when the third camera 81 acquires a face image, supplementary lighting may be conducted by the third spotlight 82 for the acquired face image to be clearer. Wherein, the third camera 81 and the third spotlight 82 may be in a separate or integral structure design, and be mounted at appropriate locations on the motorcycle 1 by a detachable way. Accordingly, the present invention may be more in line with actual application requirements.

In the first embodiment of the present invention, a supplement battery 18 is comprised further, which is electrically connected to the voltage regulation unit 22 of the AI device 2. In such way, when the power device 13 loses an electric power, a power is supplied by the supplement battery 18 continuously, in order to avoid damage or loss of electric power for the AI device 2, the first plate image acquisition device 3, the second plate image acquisition device 4, the display device 5 and the alert device 6, such that the effect of keeping stable operation is achieved.

In the first embodiment of the present invention, the alert device 6 comprises at least a buzzer 61 and a lamp set 62. In such way, an occupant may activate the alert device 6 when an emergency handling message is received during riding for the buzzer 61 and the lamp set 62 to issue an alert with sound and light as an avoidance reminder for other drivers, such that the present invention may be more practical with actual application requirements.

Figure 7:
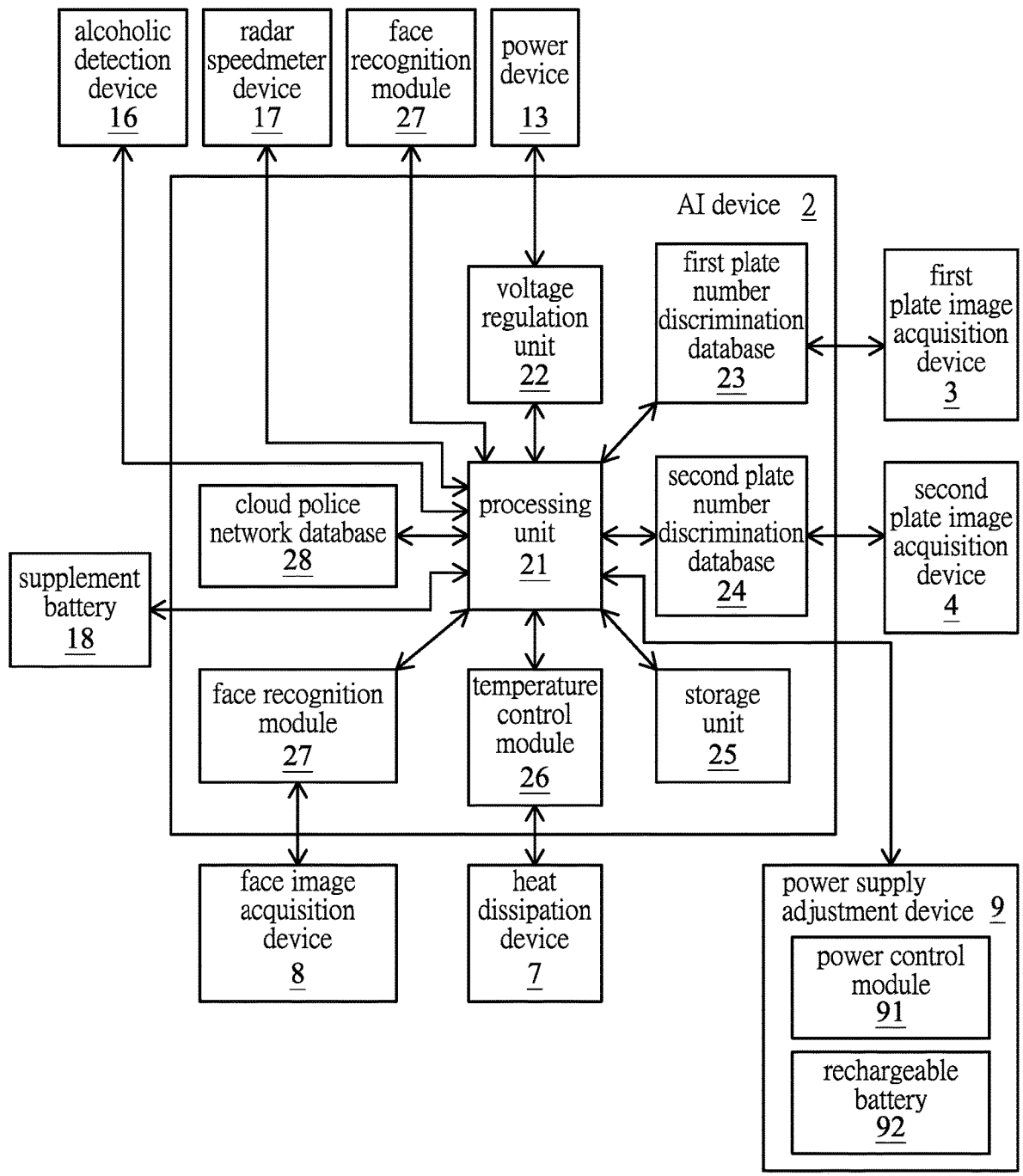
FIG. 7 is a schematic diagram showing operation blocks for another embodiment of an AI motorcycle according to the present invention.

Refer to FIG. 7, which is a schematic diagram showing operation blocks for another embodiment according to the present invention. As shown in the FIG. 7, the present invention also provides an AI motorcycle comprising a motorcycle 1, an AI device 2, a first plate image acquisition device 3, a second plate image acquisition device 4, a display device 5 as well as a power supply adjustment device 9. The alert device 6 may be comprised or not provided in this embodiment.

This embodiment and the embodiment mentioned above are different in that the power adjustment device 9 is electrically connected to a processing unit 21 of the AI device 2, the power supply adjustment device 9 serves as an electric power source and an electric power controller when the AI device 2, the first plate image acquisition device 3, the second plate image acquisition device 4, the heat dissipation device 7 and the display device 5 are in operation.

In another embodiment of the present invention, the power supply adjustment device 9 includes a power control module 91 and a rechargeable battery 92, the rechargeable battery 92 being electrically connected to the power control module 91, the rechargeable battery 92 serving as an electric power source for the AI device 2, the first plate image acquisition device 3, the second plate image acquisition device 4, the heat dissipation device 7 and the display device 5 in operation, the power control module 91 serving as an electric power controller for the rechargeable battery 92 in supplying power.

As such, an electric power required by the transmission device 11, the illuminating device 14, the control device 15, the alert device 6 may be supplied with the power device 13. Moreover, the power supply adjustment device 9 serves as an electric power source and an electric power controller when the AI device 2, the first plate image acquisition device 3, the second plate image acquisition device 4, the heat dissipation device 7 and the display device 5 are in operation, and may supply power required by different devices separately to maintain the stability in powering and in operation.

In summary, the AI motorcycle according to the present invention improves conventional shortcomings practically for a police officer to be capable of active detection when riding a motorcycle on patrol, achieving better effects of investigation and crime prevention mobility and prevention immediacy as well, and is equipped with multiple application functions, including a smart movable investigation and crime prevention system, a multi-lane plate number and smart street lamp recognition system, a portable face recognition system, a portable drunk driving detection system, a mobile recognition integrated radar speedmeter system, a cloud database police network system implementation, a roadside parking billing plate recognition function, and a multi-lane plate recognition, such that the present invention is progressive, practical and satisfies the needs of users to meet the requirements for patentability of an invention.

However, what described above are only preferred embodiments according to the present invention, and should not be used to limit the scope of the claims. Therefore, all equivalent changes and modifications made with reference to the claims and the specification according to present invention shall be within the scope of the claims of the present invention.

What is claimed is:

1. An AI motorcycle, including:

a motorcycle comprising a transmission device, a containing device, a power device, an illuminating device and a control device, the containing device having a cabin, the power device providing at least an electric power required by the transmission device and the illuminating device;

an AI device provided in the cabin of the carrying device, the AI device comprising a processing unit, a voltage regulation unit, a first plate number discrimination database, a second plate number discrimination database and a storage unit, the voltage regulation unit, the first plate number discrimination database, the second plate number discrimination database and the storage unit being electrically connected to the processing unit, and the voltage regulation unit being electrically connected to the power device of the motorcycle;

a first plate image acquisition device provided at a front end of the control device of the motorcycle near a right rear-view mirror, the first plate image acquisition device being electrically connected to the AI device, the first plate number discrimination database can discriminate a plate number of a vehicle in roadside parking, and a plate image for the vehicle in roadside parking being acquired by the first plate image acquisition device, followed by being discriminated from the first plate number discrimination database;

a second plate image acquisition device provided at the front end of the control device of the motorcycle near a left rear-view mirror, the second plate image acquisition device being electrically connected to the AI device, the second plate number discrimination database can discriminate a plate number of a vehicle moving straight, and a plate image for the vehicle moving straight being acquired by the second plate image acquisition device, followed by being discriminated from the second plate number discrimination database; and a display device provided at a rear end of the control device of the motorcycle, the display device being electrically connected to the AI device.

2. An AI motorcycle, including:

a motorcycle comprising a transmission device, a containing device, a power device, an illuminating device and a control device, the containing device having a cabin, the power device providing at least an electric power required by the transmission device and the illuminating device;

an AI device provided in the cabin of the carrying device, the AI device comprising a processing unit, a voltage regulation unit, a first plate number discrimination database, a second plate number discrimination database and a storage unit, the voltage regulation unit, the first plate number discrimination database, the second plate number discrimination database and the storage unit being electrically connected to the processing unit, and the voltage regulation unit being electrically connected to the power device of the motorcycle;

a first plate image acquisition device provided at a front end of the control device of the motorcycle near a right rear-view mirror, the first plate image acquisition device being electrically connected to the AI device, the first plate number discrimination database can discriminate a plate number of a vehicle in roadside parking, and a plate image for the vehicle in roadside parking being acquired by the first plate image acquisition device, followed by being discriminated from the first plate number discrimination database;

a second plate image acquisition device provided at the front end of the control device of the motorcycle near a left rear-view mirror, the second plate image acquisition device being electrically connected to the AI device, the second plate number discrimination database can discriminate a plate number of a vehicle moving straight, and a plate image for the vehicle moving straight being acquired by the second plate image acquisition device, followed by being discriminated from the second plate number discrimination database;

a display device provided at a rear end of the control device of the motorcycle, the display device being electrically connected to the AI device;

a heat dissipation electrically connected to the AI device, the heat dissipation device being provided in the cabin of the containing device and corresponding to the AI device, and the AI device having a temperature control module that can detect a temperature of the cabin or the AI device and is provided with a high temperature alert unit, followed by heat dissipation conducted by the heat dissipation device activated by the AI device;

a power supply adjustment device electrically connected to the AI device, the power supply adjustment device serving as an electric power source and an electric power controller when the AI device, the first plate image acquisition device, the second plate image acquisition device, the heat dissipation device and the display device are in operation.

3. The AI motorcycle of claim 1, wherein the processing unit is used for control and computation processing of the AI device; the voltage regulation unit can regulate the power device to an appropriate output voltage and is provided with a low-voltage alert device unit, the storage unit can at least store data from discrimination conducted from the first plate number discrimination database and the second plate number discrimination database.

4. The AI motorcycle of claim 1, wherein the AI device has a housing, which can at least accommodate the processing unit, the voltage regulation unit, the first plate number discrimination database, the second plate number discrimination database and the storage unit, and the AI device can be provided in the cabin of the containing device by means of the housing.

5. The AI motorcycle of claim 4, wherein an outer side of the housing has a radiation heat dissipation cooling coating.

6. The AI motorcycle of claim 1, wherein the first plate image acquisition device comprises a first camera and a first spotlight, the first camera acquiring a plate image of a vehicle in roadside parking, followed by discrimination conducted by the AI device.

7. The AI motorcycle of claim 6, wherein the first camera is a CL-95N-3010M camera, which uses NTSC as a signal format, uses a ⅓" CIS image sensor with 1305(H)X1049(V) of pixels, and has a scanning system of 2:1 Interlace, a built-in synchronization system, a horizontal resolution of 800TVL(CVBS 960H), a S/N ratio above 50 dB, a Burst Level of 0.286 Vp-P, a minimum illuminance of 0.1Lux, a gamma correction of 0.55 with automatic AGC, an electric shutter of 1/480 second, a video output level of 1.0Vp-p,75 ohm(CVBS 960H), a lens adopting 3.0 mm~10 mm F 1:1.6, using DC 10V to 15V as a voltage source, a power supply current of Max 80 mA(at DC+12V), a storage temperature/humidity of −20° C.~+65° C./max90%, and an operating temperature/humidity of −10° C.~+60° C./max80%.

8. The AI motorcycle of claim 1, wherein the second plate image acquisition device comprises a second camera and a second spotlight, the second camera acquiring a plate image of a vehicle moving straight, followed by discrimination conducted by the AI device.

9. The AI motorcycle of claim 8, wherein the second camera is a CL-95N-3010M camera, which uses NTSC as a signal format, uses a 1/2.8" CIS image sensor with 1920(H) X1080(V) of pixels, and has a scanning system of Progressive, a horizontal resolution of 2000TVL(CVBS 960H), a Burst Level of 0.286 Vp-P, a S/N ratio above 50 dB, a minimum illuminance of 0.1Lux, a gamma correction of 0.55 with automatic AGC, an electric shutter of 1/480 second, a video output level of 1.0Vp-p,75 ohm(AHD 1080P), a lens adopting 3.0 mm~10 mm F 1:1.6, using DC 10Vto15V as a voltage source, a power supply current of Max 80 mA(at DC+12V), a storage temperature/humidity of −20° C.~+65° C./max90%, and an operating temperature/humidity of −10° C.~+60° C./max80%.

10. The AI motorcycle of claim 1, wherein the display device is a display screen or a touch screen.

11. The AI motorcycle of claim 1, further comprising a face image acquisition device, an alcoholic detection device, a radar speedometer device or an RFID receiver, the face image acquisition device, the alcoholic detection device, the radar speedometer device and the RFID receiver being provided removably in the motorcycle, the face image acquisition device, the alcoholic detection device, the radar speedometer device and the RFID receiver being electrically connected to the AI device.

12. The AI motorcycle of claim 11, wherein the AI device further comprises a face recognition module and a cloud police network database, the face image acquisition device can acquire a face image for the face recognition module to conduct recognition in conjunction with the cloud police network database, and store the recognized data in the storage unit.

13. The AI motorcycle of claim 12, wherein the face image acquisition device has at least a third camera and a third spotlight for the face recognition module to conduct recognition in conjunction with the cloud police network database after the third camera acquires a face image.

14. The AI motorcycle of claim 2, wherein the heat dissipation device has a gas input unit and a gas output unit, the gas input unit guiding an external air into the AI device, the gas output unit guiding an internal gas out of the cabin.

15. The AI motorcycle of claim 2, wherein the power supply adjustment device includes a power control module and a rechargeable battery, the rechargeable battery being electrically connected to the power control module, the rechargeable battery serving as an electric power source for the AI device, the first plate image acquisition device, the second plate image acquisition device, the heat dissipation device and the display device in operation, the power control module serving as an electric power controller for the rechargeable battery in supplying power.

* * * * *